United States Patent [19]

Maggia

[11] Patent Number: 4,813,282

[45] Date of Patent: Mar. 21, 1989

[54] VEHICLE FUEL LEVEL SENSOR

[75] Inventor: Giorgio Maggia, Arese, Italy

[73] Assignee: Veglia Borletti S.R.L., Milan, Italy

[21] Appl. No.: 130,017

[22] Filed: Dec. 8, 1987

[30] Foreign Application Priority Data

Dec. 9, 1986 [IT] Italy .................. 54179/86[U]

[51] Int. Cl.[4] .............................................. G01F 23/36
[52] U.S. Cl. ........................................ 73/319; 73/306;
73/313; 73/316; 137/432
[58] Field of Search .................. 73/306, 316, 319, 320,
73/322, 313; 261/DIG. 40; 137/432; 338/33

[56] References Cited

U.S. PATENT DOCUMENTS

| 1,133,013 | 3/1915 | Eberhart, Jr. | 73/313 |
| 1,989,366 | 1/1935 | Jones | 73/322 |
| 2,586,619 | 2/1952 | Davis | 73/32 U |
| 3,113,282 | 12/1963 | Coleman | 338/33 |
| 3,266,312 | 8/1966 | Coleman et al. | 73/313 |
| 4,220,047 | 9/1980 | Mauboussin | 338/33 |
| 4,342,224 | 8/1982 | Hara et al. | 73/319 |
| 4,454,761 | 6/1984 | Coulange | 73/306 |
| 4,594,892 | 6/1986 | Asmundsson | 73/304 C |
| 4,702,107 | 10/1987 | Guerrini et al. | 73/319 |

FOREIGN PATENT DOCUMENTS

| 808904 | 3/1964 | Canada | 73/306 |
| 2614536 | 10/1977 | Fed. Rep. of Germany | 73/319 |
| 2900413 | 7/1979 | Fed. Rep. of Germany | 73/313 |

Primary Examiner—William A. Cuchlinski, Jr.
Assistant Examiner—Thomas B. Will
Attorney, Agent, or Firm—Klauber & Jackson

[57] ABSTRACT

A vehicle fuel level sensor comprising a hollow cylindrical body housing a sliding float, the position of which is determined by the fuel level in the fuel tank. The sensor also comprises a filter surrounding as portion of the side wall of the cylindrical body, close to the bottom wall of the same, so as to define, with the side wall, a first chamber; and a plate for supporting the filter and connected to the bottom wall of the hollow cylindrical body so as to define, with the bottom wall, a second chamber communicating directly with the first chamber and, via a through hole in the bottom wall, with the inside of the hollow cylindrical body.

10 Claims, 2 Drawing Sheets

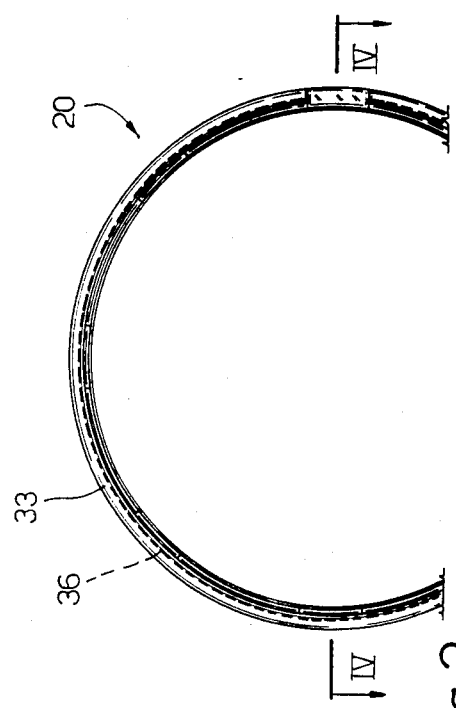
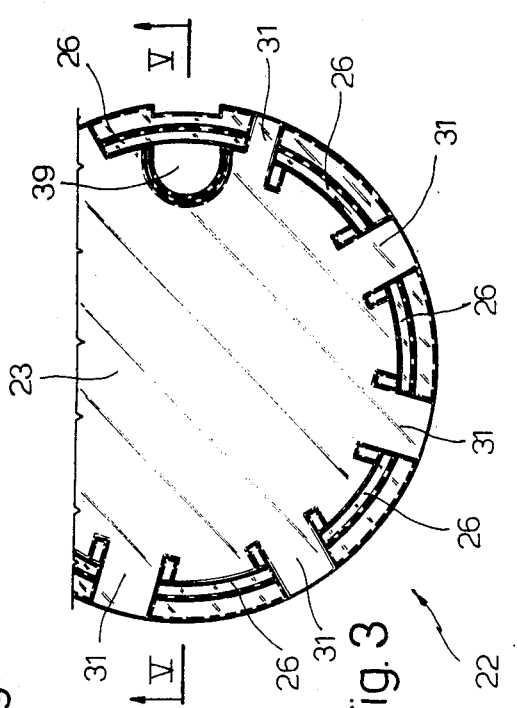
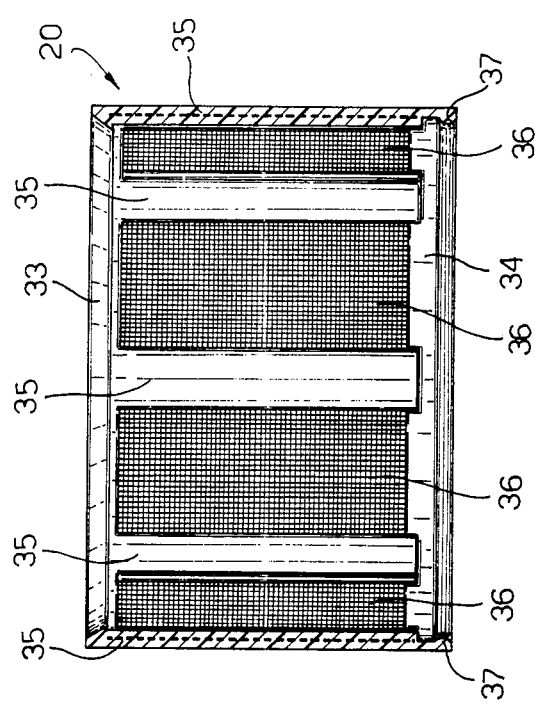
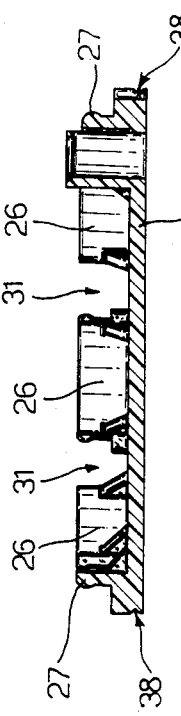
Fig. 2
Fig. 3
Fig. 4
Fig. 5

VEHICLE FUEL LEVEL SENSOR

BACKGROUND OF THE INVENTION

The present invention relates to a vehicle fuel level sensor. In particular, the present invention relates to a sensor of the type comprising a hollow body, the bottom wall of which presents a hole through which the fuel flows into the said hollow body and acts on a float sliding along a vertical guide. The said vertical guide conveniently consists of a pipe supporting a resistive wire subjected to the action of a slide on the said float, so as to define a resistor varying as a function of the fuel level inside the tank.

In actual use, the pipe supporting the said resistive wire acts as an intake pipe for the fuel inside the tank, for the performance of which function the bottom end of the said pipe projects from the bottom wall of the said hollow body and communicates with the inside of the tank via a flat filter, usually fitted to the said bottom wall. A major drawback of sensors of the aforementioned type is that the filter, being located close to the bottom wall of the tank, is easily clogged by particles either in the fuel or settling at the bottom of the tank. On Diesel engine vehicles, for example, the paraffin in the Diesel fuel tends to solidify at low temperature and settle at the bottom of the tank, thus clogging the filter, impairing operation of the sensor, and cutting off fuel supply even when the tank is full.

SUMMARY OF THE INVENTION

The aim of the present invention is to provide a fuel level sensor designed to overcome the aforementioned drawbacks associated wtih the aforementioned known types of sensors.

With this aim in view, according to the present invention, there is provided a vehicle fuel level sensor comprising:

a hollow body designed to fit on to the top wall of the fuel tank and substantially presenting a side wall, and a bottom wall having a through hole through which, in use, the fuel flows into the said body;

a float designed to slide inside the said body by virtue of the hydrostatic thrust exerted by the said fuel; and means for detecting the position of the said float; characterised by the fact that it comprises:

a filter mounted facing at least part of the outer surface of the said side wall of the said hollow body, close to the said bottom wall, and defining, with the said side wall, a first chamber; and a body for supporting the said filter and facing the said bottom wall so as to define, with the said bottom wall, a second chamber communicating directly with the said first chamber and, via the said through hole, with the inside of the said hollow body.

BRIEF DESCRIPTION OF THE DRAWINGS

A preferred non-limiting embodiment of the present invention will be described by way of example with reference to the accompanying drawings, in which:

FIGS. 2 and 3 show larger-scale, partial plan views respectively of the filter and respective supporting body in FIG. 1;

FIGS. 4 and 5 show respective sections along lines IV-IV and V—V in FIGS. 2 and 3.

DETAILED DESCRIPTION OF THE INVENTION

Figure 1:
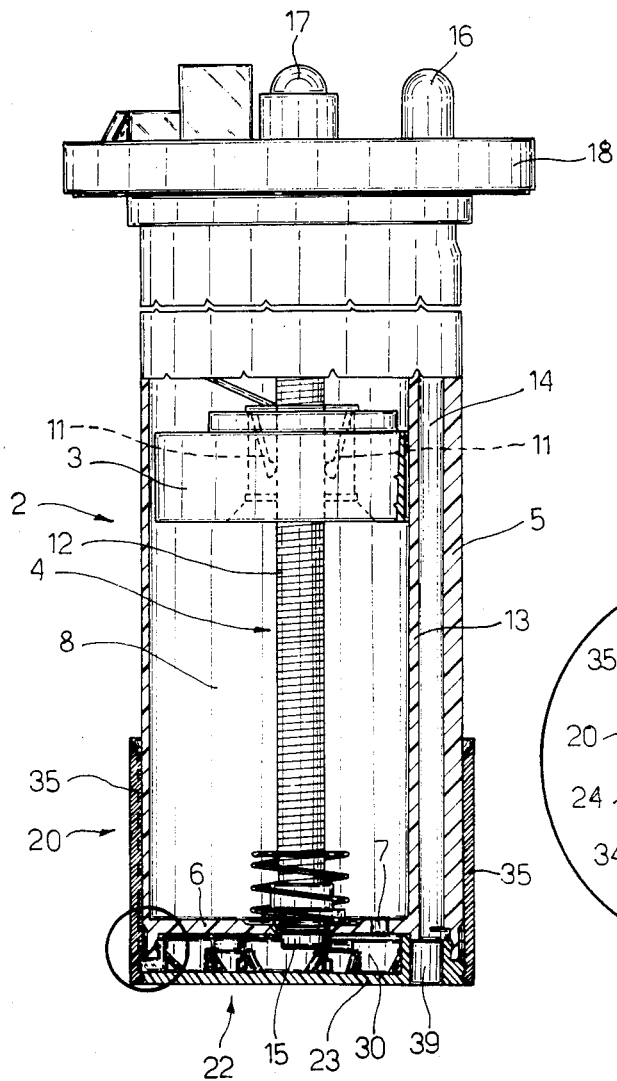
FIG. 1 shows a partial section of a sensor in accordance with the teachings of the present invention.

Number 1 in FIG. 1 indicates a sensor for detecting the fuel level inside a vehicle fuel tank (not shown). Sensor 1 comprises a hollow, substantially cylindrical body 2 housing a float 3 designed to slide along a tubular guide 4. The said body 2 presents a cylindrical side wall 5, and a bottom wall 6 to which the bottom end of guide 4 is secured in substantially known manner. The said bottom wall 6 presents a through hole 7 through which, in use, fuel flows into a chamber 8 in hollow body 2, so as to determine the position of float 3 as a function of the fuel level inside the said tank. The position of float 3 is detected in substantially known manner by means of a number of electrical contacts 11 on float 3, which contacts slide over the surface of tubular guide 4 which is wound with a resistive wire 12.

Next to the said side wall 5, hollow cylindrical body 2 presents a tubular portion 13 defining a fuel recirculating duct 14, which fuel is sucked in through the bottom end 15 of tubular guide 4. Both tubular portion 13 and guide 4 communicate with respective end portions 16, 17 on a flanged cover 18 designed to fit on to the top wall (not shown) of the said tank.

Figure 1A:
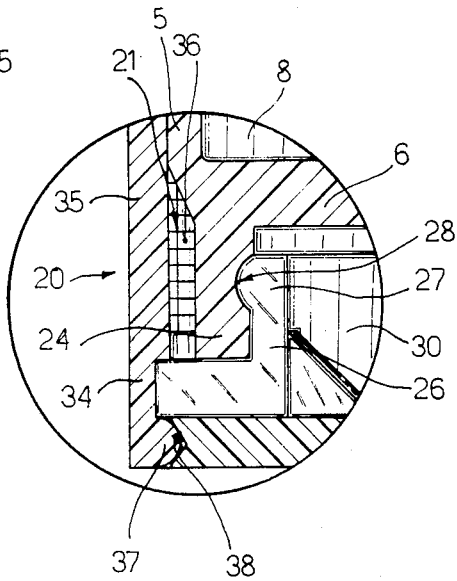
FIG. 1a shows an exploded cross-section of the circled portion of FIG. 1.

As shown, particularly in FIG. 1, according to the present invention, sensor 1 comprises a substantially tubular filter 20 mounted facing the bottom outer surface portion of side wall 5 on body 2, so as to define, with the said side wall 5, a substantially annular chamber 21. The said filter 20 is secured to hollow body 2 by means of a supporting body 22 substantially consisting of a plate 23 (FIGS. 3 and 5) mounted facing bottom wall 6 of body 2. In more detail, plate 23 is connected to an annular projection 24 extending from wall 6, by means of a number of appendixes 26 equally spaced along the edge of plate 23 itself. As shown, particularly in FIG. 1a, one end of each appendix 26 presents, on the outward side, a projection 27 defined by a spherical surface designed, in use, to engage an annular groove 28 on the inward side of annular projection 24, substantially next to bottom wall 6 of body 2. Body 22 supporting filter 20 is thus secured to cylindrical body 2 in such a manner as to define a chamber 30 together with opposite bottom wall 6 of body 2. The said chamber 30 communicates with chamber 21, defined by the opposite surfaces of filter 20 and side wall 5 of body 2, via cavities 31 (FIG. 5) defined by adjacent appendixes 26 on body 22.

Tubular filter 20 substantially consists of a coaxial pair of annular end portions 33, 34 connected longitudinally by a number of equally spaced longitudinal elements 35 between which are inserted a number of tight mesh filtering elements 36. Filter 20 is supported on body 22 by bottom annular end portion 34. In more detail, the said end portion 34 presents, inwards, an annular projection 37 having a rounded surface designed to engage an annular V-shaped groove 38 on the outside of plate 23 on supporting body 22 (FIGS. 4 and 5). As shown in FIG. 3, plate 23 also presents a through hole 39 through which fuel recirculating duct 14 (FIG. 1) communicates, in use, with the inside of the tank.

Operation of sensor 1 is as follows. Once sensor 1 is fitted to the tank through flanged cover 18, the fuel inside the tank flows into chamber 8 defined by body 2. In more detail, the fuel flows through filtering elements 36 of filter 20 into chamber 21 (FIG. 1a) and, from there, through cavities 31 into chamber 30 and, finally, into chamber 8 through hole 7, so as to settle at the same level as inside the tank. The hydrostatic thrust exerted by the fuel displaces float 3, the exact position of which inside sensor 1 is detected in known manner on the basis of the resistance of resistive wire 12 between its terminal and a contact portion over which slide the electrical contacts 11 on float 3. The fuel inside the tank in which sensor 1 is fitted is sucked up through end portion 15 of tubular guide 4, which sucks up the fuel inside the said chamber 30. In the case of Diesel fuel, this usually contains substances, such as paraffin, which solidify and settle on the bottom of the tank at low temperature, thus forming a layer which tends to clog filter 20 gradually upwards. By virtue of the said filter extending upwards, however, a fair percentage of filtering elements 36 (obviously the ones higher up) nevertheless still enable fuel to flow into chamber 21 and, from there, into chamber 30, thus enabling fuel intake to the engine and correct fuel level indication by float 3.

The advantages of sensor 1 according to the present invention will be clear from the foregoing description. Despite fuel continuing to be sucked up from the bottom of the tank, the present invention provides for substantially overcoming the problem of fuel intake being impaired by clogging of the filter of substances which, at low temperature, tend to solidify and settle on the bottom of the tank. Furthermore, such is achieved quite simply, while at the same time radically altering the position of the filter in relation to the sensor body.

To those skilled in the art it will be clear that changes may be made to sensor 1 as described and illustrated herein without, however, departing from the scope of the present invention. For example, instead of being tubular with filtering elements arranged as shown in FIG. 4, filter 20 may present a single filtering element conveniently spaced in relation to side wall 5 of body 2 so as to define a chamber (similar to chamber 21) for feeding fuel into the said chamber 20.

I claim:

1. A vehicle fuel level sensor for a fuel tank comprising:
    a hollow body designed to fit onto a top wall of the fuel tank and substantially presenting a side wall with an outer surface, and a bottom wall having a through hole through which fuel flows into said body;
    a float designed to slide inside said body by virtue of the hydrostatic thrust exerted by said fuel; and
    means for detecting the position of said float;
    a filter mounted facing at least part of the outer surface of said side wall of said hollow body, close to said bottom wall, and defining, with said side wall, a first chamber; and
    a supporting body for supporting said filter and facing said bottom wall so as to define, with said bottom wall, a second chamber communicating directly with said first chamber and, via said through hole, with the inside of said hollow body.

2. A sensor as claimed in claim 1, wherein said filter is tubular and said first chamber is annular.

3. A sensor as claimed in claim 2, wherein said filter includes a pair of annular end elements connected by a number of longitudinal elements between which are inserted a number of filtering elements.

4. A sensor as claimed in claim 3, wherein one of said annular end elements is a bottom annular element and includes means for enabling mechanical connection to said supporting body.

5. A sensor as claimed in claim 4, wherein said mechanical connecting means includes an annular projection extending radially inwards of said bottom annular element; said annular projection engaging a radial annular groove on the outside of said supporting body.

6. A sensor as claimed in claim 1, wherein said supporting body includes a plate mounted facing said bottom wall and held in place by connecting means.

7. A sensor as claimed in claim 6, wherein said connecting means includes a number of appendixes extending from said plate and presenting engaging means cooperating with respective supporting means on said body close to said bottom wall.

8. A sensor as claimed in claim 7, wherein said engaging means includes end projections extending from said appendixes and cooperating with respective seats on a projection extending from said bottom wall.

9. A sensor as claimed in claim 8, wherein said projection extending from said bottom wall is annular, and said seat on said projection includes an annular groove.

10. A sensor as claimed in claim 1, wherein said sensor includes a cover, and wherein said means for detecting the position of said float includes a resistive wire wound about a tubular guide and cooperating with at least one contact element on said float; one end of said tubular guide extending axially beyond said bottom wall and communicating directly with said second chamber; and a second end of said tubular guide communicating with a fuel supply pipe substantially located on the cover of said sensor.

* * * * *